United States Patent [19]

Alvi et al.

[11] Patent Number: 4,717,300
[45] Date of Patent: Jan. 5, 1988

[54] PIN FOR A FASTENER, AND METHOD OF MAKING SAME

[75] Inventors: Zia R. Alvi, Hatfield; Christopher R. Hiblen, Welwyn Garden City, both of England

[73] Assignee: Avdel Limited, Hertfordshire, England

[21] Appl. No.: 7,506

[22] Filed: Jan. 28, 1987

[30] Foreign Application Priority Data

Feb. 11, 1986 [GB] United Kingdom ............... 8603299

[51] Int. Cl.$^4$ ................................................. C21D 9/00
[52] U.S. Cl. .................................. 411/361; 148/12 B; 148/12.1; 148/12.4
[58] Field of Search ................. 148/12.1, 12.4, 12 R, 148/12 B; 411/361

[56] References Cited

U.S. PATENT DOCUMENTS

| | | | |
|---|---|---|---|
| 3,344,817 | 10/1967 | Connard | 148/12.1 |
| 3,532,560 | 10/1970 | Tomioka et al. | 148/12 B |
| 4,519,736 | 5/1985 | Sigmund | 411/361 |
| 4,531,871 | 7/1985 | Sigmund | 411/361 |
| 4,540,447 | 9/1985 | Mercer | 148/12 B |
| 4,584,032 | 4/1986 | Isokawa | 148/12 B |
| 4,653,969 | 3/1987 | Summerlin | 411/361 |

Primary Examiner—Wayland Stallard
Attorney, Agent, or Firm—Oblon, Fisher, Spivak, McClelland, & Maier

[57] ABSTRACT

A headed steel pin for a multi-grip fastener of the pin and swageable collar type has a homogeneous microstructure, and consists substantially entirely of sorbitic tempered martensite. Suitable coarse-grained medium carbon steel is shaped to form a headed pin having a plurality of identical, regularly spaced, annular, combination grooves each able to function alternatively as a locking groove, a pulling groove, or a breaker groove. The shaped pin is heat treated, the steel rendered homogeneously martensitic and then tempered at a temperature approaching as closely as practicable to the lower critical temperature of the steel, to convert the martensitic steel entirely to sorbite. The finished pin has a suitable balance of brittleness, toughness, ductility and impact strength, and tends to break cleanly and reliably at a selected one of the combination grooves when the fastener is installed in a workpiece.

12 Claims, 2 Drawing Figures

PIN FOR A FASTENER, AND METHOD OF MAKING SAME

This invention relates generally to fasteners, and more particularly to a pin for a fastener of the type comprising a swageable tubular member, hereinafter for brevity referred to as a collar, and a steel pin having a plurality of annular grooves into which the collar can be swaged, at least one of the grooves defining a breakneck at which the pin will break when subjected to a predetermined tensile stress, whereby a portion of the pin can be separated from the remainder of the pin once it has fulfilled its purpose, and also relates to a method of making a pin for such a fastener.

The invention relates particularly, although not exclusively, to fasteners of the type shown in our co-pending British Patent Application Nos. 84 09167 and 85 15258, and in which the pin has a series of similar and closely adjacent grooves each of which defines a breakneck and is able to serve as either a breakergroove or a locking groove for locking engagement with swaged material of the collar. Such grooves are known as "combination grooves" and, the fasteners are referred to as "multi-grip fasteners" since they are able to accommodate a variety in the thickness of workpiece materials in which they are utilised.

As explained in the copending patent Applications, the contour of all the combination grooves is such that any one of the grooves, when located at the outer end of the collar, at which swaging is begun, will function as a breakneck. In order that the pin should possess suitable mechanical properties and perform satisfactorily and consistently (as between different samples of nominally identical pins), particularly as regards the strength of the pin, the position of the break, and the contour of the surface produced on fracture, it has been found necessary to use a suitable heat treatment to impart desired qualities to the pin. If the material of the finished pin is either too brittle or too soft, breaks may occur in a groove remote from the collar, or the pin may fracture before the collar is completely swaged. On the other hand, the material of the finished pin may undergo excessive stretching before fracture, or breaks may occur within the collar or may extend obliquely across more than one groove.

We have now established a type of steel and a heat treatment for the steel, which makes possible the manufacture of pins for fasteners of the type referred to, which pins have desirable mechanical properties.

According to the present invention, there is provided a pin for a fastener of the type comprising a swageable tubular member and a pin having a plurality of annular grooves into which the tubular member can be swaged, and wherein at least one of the grooves defines a breakneck at which the pin will break when subjected to a predetermined tensile stress, said pin comprising an elongate, annularly grooved shank having a substantially homogeneous microstructure consisting substantially entirely of sorbitic tempered martensite.

According to another aspect of the invention, there is provided a method of making a pin for a fastener of the type comprising a swageable tubular member and a pin having a plurality of annular grooves into which the tubular member can be swaged, and wherein at least one of the grooves defines a breakneck at which the pin will break when subjected to a predetermined tensile stress, the method comprising:

(a) cold working spheroidised annealed deoxidised medium carbon steel to form a pin-blank having the shape desired of the pin for the fastener, and having a coarse-grained microstructure having a grain size of from ASTM 3 to ASTM 7;

(b) heating the pin-blank in a carbon-restoring atmosphere to a temperature exceeding the A3 critical temperature of the steel until the steel of the pin-blank becomes completely austenitic, and has a substantially homogeneous, coarse-grained microstructure, (c) quenching the austenitic pin-blank to convert the austenite to martensite, and (d) tempering the martensitic pin-blank to convert the martensite to sorbite.

The said temperature to which the pin-blank is heated to render the steel austenitic may exceed the A3 critical temperature by from 50 degrees Celsius to 150 degrees Celsius.

The austenitic pin-blank may be quenched in oil.

The martensitic pin-blank may be tempered at a temperature not exceeding, but approaching as closely as practicable to, the A1 critical temperature.

The martensitic pin-blank may be tempered at a temperature in the range 650 degrees Celsius to 700 degrees Celsius.

The pin-blank may be soaked at the austenitising temperature for a period of from 30 minutes to 90 minutes.

The steel may be a silicon-killed steel.

The steel may have an initial carbon content of from 0.3% to 0.6% by weight.

The carbon-restoring atmosphere may provide a carbon potential sufficient to maintain the carbon content at the surface of the pin-blank at a value not less than that of the steel before heating the pin-blank.

The carbon-restoring atmosphere may provide a carbon potential at or near the surface of the pin blank of from about 0.4% to about 0.7%. The carbon-restoring atmosphere may have a dew point in the range from −4 degrees Celsius to +1 degree Celsius.

The invention will now be described by way of example and with reference to a specific embodiment as shown in the accompanying drawings in which.

Figure 1:
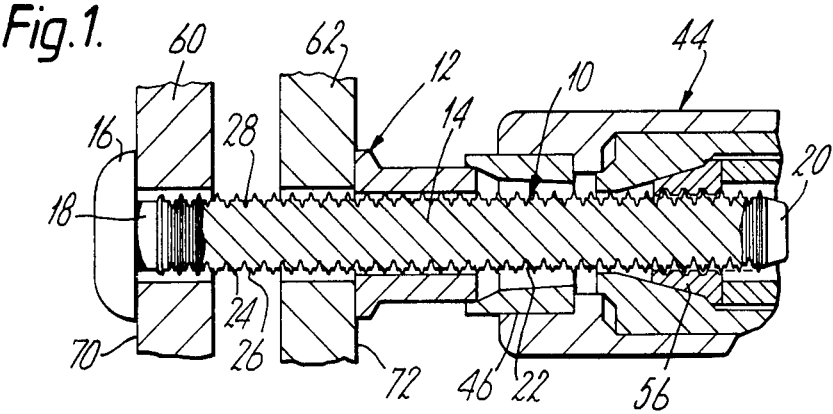
FIG. 1 is a view, partly in section, of a fastener incorporating a pin according to the invention, together with a workpiece to be joined, and part of an installation tool, the view showing the pin in side elevation but with surface details mainly omitted in the interests of clarity.

The embodiment of the invention illustrated by way of example is a multigrip fastener of the variety commonly known as a lockbolt. Referring to FIG. 1, the fastener comprises a pin 10 and a tubular member 12 in the form of a collar of generally cylindrical shape having a flange at one end. The collar member 12 is of swageable steel, and the pin 10 is of a steel, the nature of which will be discussed hereinafter.

The pin 10 comprises an elongate shank 14, having a radially enlarged head 16 at one end. The shank 14 has a short cylindrical portion 18 immediately adjacent to the head 16, and a tapered portion, or bevel, 20 at the end remote from the head, (i.e. the "tail-end" of the shank).

The remainder of the length of the shank between the cylindrical portion 18 and the bevel 20 is formed with a plurality of substantially identical, regularly spaced, annular grooves 22. Thus, together, the grooves 22 occupy nearly the whole length of the shank 14. Each groove 22 is a combination groove, which is to say that it is able to function alternatively as a locking groove, a pulling groove or a breaker groove. Thus each of the grooves 22 lies between profiled flanks 24, 26 the shape of which is such as to facilitate the gripping and pulling of the shank by means of a suitable gripping and pulling tool, and such that the groove can receive material of the collar when the collar is swaged so as to deform it radially inwardly. The flanks of the groove then serve to abut the material of the collar which has entered the groove, and thus to resist axial movement of the pin relative to the collar, and hence to lock the pin and collar together.

The flanks of each groove are profiled to converge in the direction radially inwardly of the shank, and meet at an arcuate region having a small radius of curvature in the longitudinal sense to form the bottom or root 28 of the groove. The material of the shank radially inwardly of the root of each groove forms a narrow breakneck the diameter of which is controlled, in conjunction with the mechanical properties of the material of the shank, to ensure that the breakneck will break under a predetermined tensile load, which can be the same for each of the breaknecks.

The collar 12 is a clearance fit over the shank 14 of the pin 10, and its axial length is sufficient to cover several adjacent grooves 22 of the pin, in this example about six or seven of the grooves.

An installation tool 44, in the form of a conventional pulling and swaging tool of the type employed for installing lockbolts is used to install the fastener of this example. It has an annular swaging anvil 46 and gripping and pulling jaws 56 having teeth of appropriate form to engage in the combination grooves 22 of the pin 10. Actuation of the tool will cause the jaws 56 to grip a grooved pin 10 inserted through the anvil and between the jaws, and to retract the pin rearwardly with respect to the anvil so as to exert a pulling force on the pin.

Figure 2:
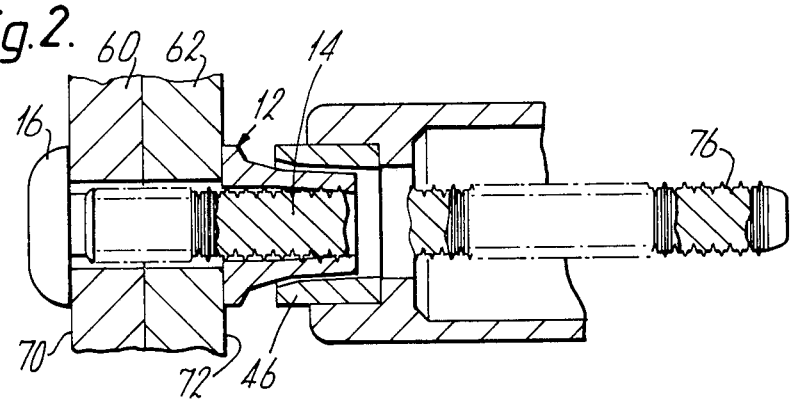
FIG. 2 is a view, similar to FIG. 1, but illustrating the fastener on completion of installation.

In use, the pin 10 is inserted through aligned apertures in panel members 60, 62 of a workpiece which are to be fastened so that the head 16 abuts one face 70 of the workpiece and the shank projects beyond the opposite face 72 of the workpiece. The collar 12 is then placed round the projecting part of the shank so as to abut the face 72, and the tool is offered up to the fastener and actuated so as to grip and pull the shank 18 while the collar is supported at its outer end (that is, the end remote from the face 72) by the anvil 46. This clamps the panel members tightly between the head 16 and the collar 12, as can be seen in FIG. 2, after which continued pulling causes the anvil to progressively swage the collar radially inwardly, starting at its outer end and progressing towards the workpiece. Eventually, the tensile load on the pin increases to the predetermined tensile load at which the pin will break, allowing the tool and a broken-off portion of the shank of the pin to be removed, leaving the swaged collar and the remainder of the pin fastening the members of the workpiece together.

The action of the anvil in swaging the collar progessively from its outer end results in a radially inward force being exerted on the pin in the region just within the outer end of the collar, and the direction of this force is translated by the flanks of grooves in this region to create axial forces which impose an additional tensile load on the breakneck at the root of those grooves. Accordingly the pin tends always to fracture in this region, and this fact is relied upon to achieve what is very desirable that the pin will break at a position flush with or just below the outer end surface of the collar at which the tensile force is greatest, as shown in FIG. 2.

However, the metallurgical condition of the material of the pin can significantly influence the suitability of the pin for its purpose, and the consistency with which the pin will break at the desired position, and the shape of the surface produced by fracture of the pin.

In particular, it is important to provide the pin with appropriate tensile, shear and impact strengths, grain size, and hardness, while avoiding excessive softness, ductility and brittleness.

In making the pin, we form a pin-blank having the shape and dimensions desired of the finished pin for the fastener, using a medium carbon steel suitable for cold-forming, and having a fairly coarse grained micro-structure, and then heat-treat the steel pin-blank to develop the desired mechanical properties. A steel having the following range of composition by weight per cent, or similar thereto, is suitable:

Carbon: 0.3 to 0.6
Silicon: 0.1 to 0.5
Manganese: 0.9 to 2.0
Sulphur: Maximum 0.05
Phosphorus: Maximum 0.05
Iron: Balance Thus, in this example, we form a pin having a nominal diameter of one quarter inch (6.35 mm), using a silicon-killed steel having the following composition, by weight percent:

Carbon: 0.41
Silicon: 0.26
Manganese: 1.54
Sulphur: 0.016
Phosphorus: 0.016
Iron: Balance The carbon constituent of the steel is, of course, that which enables the bulk of the composition to be hardened. The silicon is added to deoxidise the steel during its preparation. The use, as a deoxidant, of silicon, rather than, for example, aluminium, is preferred since the resulting steel has a tendency to form a coarse grain, which we find desirable, whereas aluminium tends to cause the formation of a finer grain.

The manganese constituent may be derived from manganese added to deoxidise the steel. The presence of manganese is desirable since it increases the hardenability of the steel.

The sulphur and phosphorus are merely tolerated as impurities, the amounts of which should not appreciably exceed the maxima stated.

In making the pins 10, we use commercially available drawn wire stock formed of steel of the stated composition and treated appropriately to render it suitable for making the pins.

Thus the wire stock will have been prepared by hot rolling billet steel to form rods, the rods being spheroidised annealed and the steel rendered suitable for cold forming, and the austenitic grain size being optimised.

The annealing of the rods is preferably carried out in a controlled atmosphere to prevent scaling and depletion of carbon in the steel, and avoid the need for a subsequent descaling operation. However, if they become scaled during annealing, they are then descaled.

We prefer that the austenitic grain size in the rods be between ASTM 3 and about ASTM 6. If the grain size is larger than ASTM 3 we find it too coarse for satisfactory working by conventional cold heading and rolling processes, and if the grain size is finer than ASTM 7, the mechanical properties of the finished pins are adversely effected.

The annealing process is carried out at a temperature and for a period of time appropriate to achieve the desired austenitic grain size, and after slow cooling of the rods, the steel will consist of coarse-grained pearlite colonies together with some small amount of ferrite interspersed between the colonies.

The annealed rods, descaled if necessary, are then drawn to wire of the appropriate diameter (to 6.33 mm diameter for the pins of this example) and the wire is then further processed by cold forming to form pin-blanks. Thus, the wire is cropped into lengths appropriate to form pin-blanks and each cut length is then cold-headed to form the radially enlarged head 16 at one end of an elongate cylindrical shank, thus forming a precursor of a pin-blank. The precursor is then rolled between suitably profiled flat-bed rolling dies to form the plurality of annular combination grooves 22 along the length of the shank and the bevel 20 at the end of the shank remote from the head, leaving the short portion 18 adjacent to the head with a plain cylindrical surface, thereby forming a pin-blank.

The cold forming operations performed will inevitably alter the grain size and mechanical properties of the original wire stock. The pin-blank is therefore heat-treated to impart the desired mechanical properties to the steel, and thus form the finished pin.

Thus, in a first stage of the heat-treatment the pin-blank is heated to a high temperature, above the Ac3 temperature, in a heat-treatment furnace to completely austenitize the steel and develop a coarse-grained microstructure. By "coarse-grained" as used herein, we mean a grain size larger than ASTM 7.

The steel will become fully austenitic at a temperature of about 830 degrees Celsius, but in order to ensure that an adequate temperature is reached and that the grain size will increase adequately, we heat the pin-blanks to a temperature exceeding this by at least a small increment, and we consider that a temperature of 850 degrees Celsius is the minimum for this purpose, while the temperature could be raised as high as 950 degrees Celsius.

In order to avoid depletion of the carbon content of the steel of the pin-blank during the first stage of the heat-treatment, with consequent loss of hardenability of the steel particularly at and near the surface of the pin-blank, the first stage of the heat-treatment is carried out in a carbon-restoring atmosphere which is controlled to maintain the carbon content at the surface of the pin at, or restore it to, a value not appreciably less than the nominal value for the carbon content of the original wire stock. Thus, using an endothermic atmosphere of air and natural methane gas as a carburising medium in the furnace, a carbon potential at the surface of the pin of 0.40% to 0.70% can be achieved by maintaining the dew point of the furnace atmosphere between −4 degrees Celsius and +1 degree Celsius.

The duration of the high temperature heating in the first stage of treatment can be from about three quarters of an hour to about two hours.

In the present example, the pin-blank was heated to and maintained at a temperature of 880 degrees Celsius for one hour, while maintaining a carbon-restoring atmosphere, by means of methane, at a dew point of −1 degree to −4 degrees Celsius, thus maintaining a carbon potential at the surface of the pin-blank of approximately 0.6%.

At the end of the period of heating in the first stage, the pin-blanks are then cooled rapidly from the high temperature, at a rate above the critical cooling rate, in order to convert the austenite of the steel entirely to martensite. We prefer to quench the pin-blanks by plunging them, at their austenitising temperature, into oil. We find that aqueous media are too drastic and tend to produce cracking or distortion of the pin-blanks, while an air quench is insufficiently rapid to avoid the formation of appreciable amounts of pearlite and ferrite in the steel.

After quenching, the martensitic pin-blanks are then reheated to a temperature approaching as close as practicable to the A1 critical temperature without actually reaching or exceeding it, and are then allowed to cool in air, so as to temper the martensitic steel, converting the martensite to secondary sorbite.

In conventional heat treatment processes involving tempering of steel, it is not normal to temper at temperatures above about 650 degress Celsius, but we have found that a high temperature tempering treatment is appropriate to develop the mechanical properties which we desire in a pin for a multi-grip fastener.

Thus, in order to temper the martensitic pin-blank, we heat it to a temperature approaching within 60 degrees Celsius and preferably within twenty degrees Celsius of the Ac1 temperature. In this example, the pin-blank was formed of a steel of which the lower critical point (Ac1) is at a temperature of 710 degrees Celsius, and was tempered by heating to 700 degrees Celsius and maintaining this temperature for one hour, after which the resulting pin was allowed to cool in air.

The finished pin thus produced has a homogeneous microstructure throughout, and consists substantially entirely of sorbitic tempered martensite. Due to taking the precaution of heating the pin-blanks in a carburising atmosphere, and thus avoiding carbon depletion at the surface, the finished pin does not have any appreciable amount of ferrite at the surface such as would result if carbon depletion were to have occurred, and the surface of the pin is equally as hard as the core.

Due to the finely crystalline structure of the sorbitic martensite, the size of the grains derived from the previous austenitic condition of the steel is not apparent. Nevertheless, we find that by controlling the prior austenitic grain size to be in the range of ASTM 3 to ASTM 6, the finished pin has a suitable balance of brittleness, toughness, ductility and impact strength appropriate to its purpose.

By quenching the pin-blank while at its austenitizing temperature, rather than allowing any cooling below the Ar3 temperature such as would permit some of the austenite to change to a mixture of pearlite and ferrite, the microstructure of the pin-blank becomes substantially exclusively martensitic, finely crystalline and completely homogeneous throughout, and also very hard.

The subsequent tempering step, performed at a temperature approaching the Ac1 temperature, relieves the hardness without in any way altering the homogeneity of the finely crystalline microstructure, and consequently the finished pin will have good impact strength and a relatively low transition temperature so that it will not become brittle in cold weather conditions.

We claim:

1. A method of making a pin for a fastener of the type comprising a swageable tubular member and a pin having a plurality of annular grooves into which the tubular member can be swaged, and wherein at least one of the grooves defines a breakneck at which the pin will break when subjected to a predetermined tensile stress, the method comprising:
   (a) cold working spheroidised annealed, deoxidised, medium carbon steel to form a pin-blank having the shape desired of the pin for the fastener, and having a coarse-grained microstructure having a grain size of from ASTM 3 to ASTM 7;
   (b) heating the pin-blank in a carbon-restoring atmosphere to a temperature exceeding the A3 critical temperature of the steel until the steel of the pin-blank becomes completely austenitic, and has a substantially homogeneous, coarse-grained microstructure,
   (c) quenching the austenitic pin-blank to convert the austenite to martensite, and
   (d) tempering the martensitic pin-blank to convert the martensite to sorbite.

2. A method according to claim 1, wherein the said temperature to which the pin-blank is heated to render the steel austenitic exceeds the A3 critical temperature by from 50 degrees Celsius to 150 degrees Celsius 3. A method according to claim 1, wherein the austenitic pin-blank is quenched in oil.

4. A method according to claim 1, wherein the martensitic pin-blank is tempered at a temperature not exceeding, but approaching as closely as practicable to, the A1 critical temperature.

5. A method according to claim 1, wherein the martensitic pin-blank is tempered at a temperature above 650 degrees Celsius.

6. A method according to claim 1, wherein the pin-blank is soaked at the austenitising temperature for a period of from 30 minutes to 90 minutes.

7. A method according to claim 1, wherein the steel is a silicon-killed steel.

8. A method according to claim 1, wherein the steel has an initial carbon content of from 0.3% to 0.6% by weight.

9. A method according to claim 1, wherein the carbon-restoring atmosphere provides a carbon potential sufficient to maintain the carbon content at the surface of the pin-blank at a value not less than that of the steel before heating the pin-blank.

10. A method according to claim 1, wherein the carbon-restoring atmosphere provides a carbon potential at or near the surface of the pin blank of from about 0.4% to about 0.7%.

11. A method according to claim 1, wherein the carbon-restoring atmosphere has a dew point in the range from −4 degrees Celsius to +1 degree Celsius.

12. A pin for a fastener of the type comprising a swageable tubular member and a pin having a plurality of annular grooves into which the tubular member can be swaged, and wherein at least one of the grooves defines a breakneck at which the pin will break when subjected to a predetermined tensile stress, said pin comprising an elongate, annularly grooved shank having a substantially homogeneous microstructure consisting substantially entirely of sorbitic tempered martensite, said pin being made by the method comprising:
    (a) cold working spheroidised annealed, deoxidised, medium carbon steel to form a pin-blank having the shape desired of the pin for the fastener, and having a coarse-grained microstructure having a grain size of from ASTM 3 to ASTM 7;
    (b) heating the pin-blank in a carbon-restoring atmosphere to a temperature exceeding the A3 critical temperature of the steel until the steel of the pin-blank becomes completely austenitic, and has a substantially homogeneous, coarse-grained microstructure,
    (c) quenching the austenitic pin-blank to convert the austenite to martensite, and
    (d) tempering the martensitic pin-blank to convert the martensite to sorbite.

* * * * *